K. KLAUSE.
CULTIVATOR.
APPLICATION FILED JUNE 9, 1919.

1,326,065. Patented Dec. 23, 1919.

Inventor
Karl Klause

Witnesses
W. A. Thomas.
Thomas S. _____

By Victor J. Evans
Attorney

UNITED STATES PATENT OFFICE.

KARL KLAUSE, OF APPLETON, WISCONSIN.

CULTIVATOR.

1,326,065.  Specification of Letters Patent.  Patented Dec. 23, 1919.

Application filed June 9, 1919. Serial No. 302,688.

*To all whom it may concern:*

Be it known that I, KARL KLAUSE, a citizen of Germany, and resident of the United States since June, 1911, who made application for naturalization at Granite City, Illinois, in 1912, to become a citizen of the United States, residing at Appleton, in the county of Outagamie and State of Wisconsin, have invented new and useful Improvements in Cultivators, of which the following is a specification.

One of the objects of my invention is the provision of a cultivator embodying teeth carried in such adjustable manner that the teeth may be set to move adjacent to the surface of the ground or at various depths below the surface, and one that is light in weight and of draft, and is adapted to work in hard or soft soil for practically all cultivating purposes.

The object of the invention is the provision in a cultivator of an improved tooth-mounting in which the parts are so constructed and relatively arranged that while a tooth will be held to its work under normal conditions, the bringing up of the tooth against a stone or other obstruction will be attended by automatic release of the tooth, with the result that the same will be impelled to ride over and clear the stone or other obstruction without any injury whatever being inflicted upon the tooth by the encounter.

Figure 1:
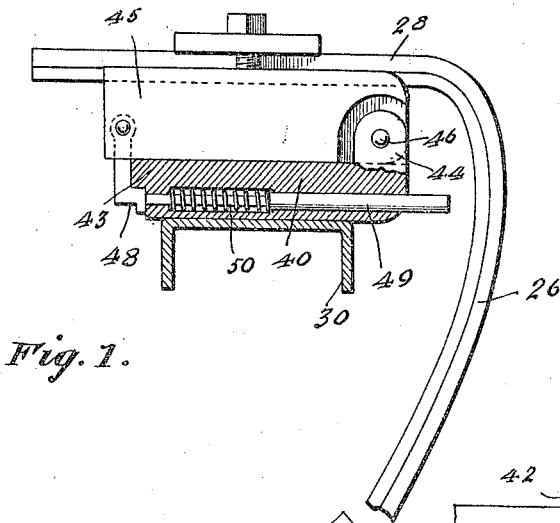
Figure 2:
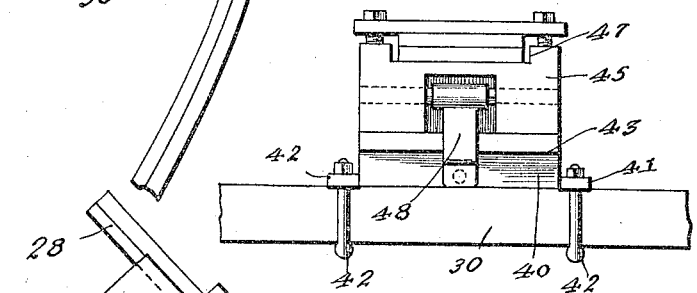
Figure 3:
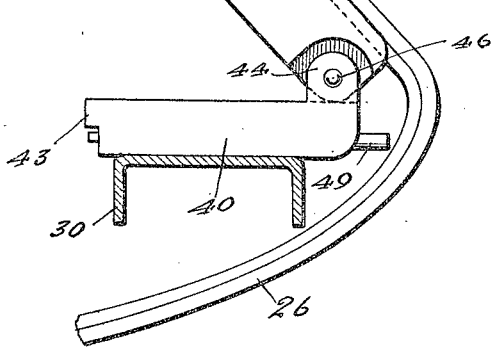

Other objects and practical advantages of the invention will be fully understood from the following description and claims when the same are read in connection with the drawings, accompanying and forming part of this specification, in which:

Figures 1, 2 and 3 are enlarged detail views illustrative of my novel tooth-mounting.

Similar numerals of reference designate corresponding parts in all of the views of the drawings.

At 30 is a cultivator frame bar by which my novel cultivator tooth is carried. The said tooth comprises a curvilinear resilient shank 26, preferably of spring steel, and a shovel 27 carried on said shank. The upper portion of the shank which merges into a rearwardly directed and approximately horizontal portion 28, is preferably in two thicknesses, as shown, and is preferably U-shaped, with the lower ends of the thicknesses permanently joined together through the medium of a loop member 29 that is fixed to the two thicknesses.

Each tooth mounting comprises a bed member 40. This bed member 40 is provided with base flanges 41 shackled at 42, or otherwise connected in fixed manner to the cross-bar on which it is superimposed. Said bed member is also provided as shown with a keeper portion 43 and at its forward end with an upstanding portion 44. In addition to said bed member 40 the mounting comprises a swinging member 45 hinged at 46 to the upstanding portion 44 of the bed member, and adapted to normally rest on the bed member in the position shown in Fig. 1. The rearwardly directed horizontal portion 28 of the tooth is arranged longitudinally in a channel 47 in the swinging member 45, and is clamped as illustrated or otherwise secured and preferably in detachable manner to said swinging member 45. Carried by the rear portion of the member 45 in pendent position, and so as to engage the keeper 43, is a swinging latch 48, and arranged in longitudinal alinement between the said latch 48 and the downwardly extending portion of the shank 26 of the tooth is a release rod 49 that is guided in a bore in the bed member 40 and is normally maintained in yielding manner in the position shown in Fig. 1 by a spring 50. The manner of operation of the tooth mounting will be readily understood by comparison of Figs. 1 and 3 when it is stated that in the event of the tooth encountering a stone or other obstruction in its path, the tooth will be sprung rearwardly sufficiently far to strike the rod 49 and to enable the release rod 49 on rearward movement of the same to displace the latch 48 from engagement with the keeper 43, whereupon the tooth will swing rearwardly and upwardly and will ride over and clear the obstruction. To reset the tooth it is simply necessary to move the member 45 downwardly and place the latch 48 into engagement with the keeper 43, as shown in Fig. 1.

Having described my invention, what I claim and desire to secure by Letters-Patent, is:

1. In a cultivator, the combination of a frame bar, a bed member fixed on said frame bar and having a keeper at its rear end and an upstanding portion at its forward end, a swinging member hingedly connected to said upstanding portion of the bed member, a swinging latch carried by the swinging member and adapted on depression of the swinging member to engage the keeper of the bed member, a release rod movable longitudinally through the bed member and against the latch to displace the same from engagement with the keeper, and a tooth connected with the swinging member and having a depending portion disposed in front of the release rod whereby undue rearward movement of the tooth will bring about rearward movement of the release rod and the release of the latch from the keeper.

2. In a cultivator, the combination of a frame bar, a bed member fixed on said frame bar and having a keeper at its rear end and an upstanding portion at its forward end, a swinging member hingedly connected to said upstanding portion of the bed member, a swinging latch carried by the swinging member and adapted on depression of the swinging member to engage the keeper of the bed member, a release rod movable longitudinally through the bed member and against the latch to displace the same from engagement with the keeper, and a tooth connected with the swinging member and having a depending portion disposed in front of the release rod whereby undue rearward movement of the tooth will bring about rearward movement of the release rod and the release of the latch from the keeper, and a spring for normally and yieldingly maintaining the release rod in forwardly advanced position.

3. The combination of a bed member, a swinging member connected thereto, a resilient member, carried by the swinging member, movable means to detachably hold the swinging member to the bed member and against swinging thereon, and means actuatable by undue rearward movement of the resilient member to disengage said movable means from the bed member and thereby release the swinging member.

4. The combination of a bed member, a tooth, a tooth-carrying member movable relatively to the bed member, means detachable from the bed member, for normally holding the tooth-carrying member against such movement, and means actuatable by undue rearward movement of the tooth for detaching said detachable means from the bed member to permit of movement of the tooth-carrying member.

5. The combination of a bed member, a tooth, a tooth-carrying member movable relatively to the bed member, and movable means detachably connecting the tooth-carrying member and the bed member and actuatable by undue rearward movement of the tooth to release the tooth-carrying member and permit of said movement thereof.

In testimony whereof I affix my signature.

KARL KLAUSE.